США010254896B2

United States Patent
Mori et al.

(10) Patent No.: US 10,254,896 B2
(45) Date of Patent: Apr. 9, 2019

(54) DISPLAY WITH CASE ELECTRICALLY CONNECTED TO GROUND

(71) Applicant: Mitsubishi Electric Corporation, Tokyo (JP)

(72) Inventors: Seiichiro Mori, Tokyo (JP); Yusuke Shimasaki, Tokyo (JP); Kageyasu Miyahara, Tokyo (JP); Yuichi Okano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/586,644

(22) Filed: May 4, 2017

(65) Prior Publication Data
US 2017/0357375 A1    Dec. 14, 2017

(30) Foreign Application Priority Data

Jun. 10, 2016 (JP) .................................. 2016-115914

(51) Int. Cl.
*G06F 3/041* (2006.01)
*G02F 1/1333* (2006.01)
*G06F 3/044* (2006.01)

(52) U.S. Cl.
CPC ........ *G06F 3/0418* (2013.01); *G02F 1/13338* (2013.01); *G06F 3/044* (2013.01)

(58) Field of Classification Search
CPC ..... G02F 1/13338; G06F 3/0418; G06F 3/044
See application file for complete search history.

(56) References Cited

U.S. PATENT DOCUMENTS

| 8,487,891 | B2 | 7/2013 | Oda et al. |
| 8,570,301 | B2 | 10/2013 | Land et al. |
| 8,749,523 | B2 | 6/2014 | Pance et al. |
| 9,158,418 | B2 | 10/2015 | Oda et al. |
| 2010/0315363 | A1 | 12/2010 | Kobayashi et al. |
| 2010/0321313 | A1 | 12/2010 | Oda et al. |
| 2010/0328256 | A1 | 12/2010 | Harada et al. |
| 2011/0006832 | A1* | 1/2011 | Land ....................... G06F 3/044 327/517 |
| 2012/0139846 | A1* | 6/2012 | Krah ..................... G06F 3/0418 345/173 |
| 2012/0268416 | A1* | 10/2012 | Pirogov ................ G06F 3/0416 345/174 |

(Continued)

FOREIGN PATENT DOCUMENTS

| JP | 2001-099609 A | 4/2001 |
| JP | 2009-276821 A | 11/2009 |

(Continued)

*Primary Examiner* — Chun-Nan Lin
(74) *Attorney, Agent, or Firm* — Studebaker & Brackett PC

(57) ABSTRACT

A display includes a touch sensor panel, a panel controller, a case, and a signal generation circuit. The touch sensor panel includes a touch sensor. The panel controller measures a capacitance of the touch sensor. The case accommodates the display, in which at least the touch sensor panel and the panel controller are disposed. The signal generation circuit is capable of applying an AC signal to a ground of the panel controller. The case is electrically connected to the ground of the panel controller. When the signal generation circuit applies the AD signal to the ground, the panel controller measures the capacitance of the touch sensor.

9 Claims, 13 Drawing Sheets

(56) References Cited

U.S. PATENT DOCUMENTS

| | | | |
|---|---|---|---|
| 2013/0050130 A1* | 2/2013 | Brown | G06F 3/044 345/174 |
| 2014/0247248 A1 | 9/2014 | Pance et al. | |
| 2015/0338989 A1* | 11/2015 | Noto | G06F 3/0416 345/174 |
| 2017/0068356 A1 | 3/2017 | Pance et al. | |

FOREIGN PATENT DOCUMENTS

| | | |
|---|---|---|
| JP | 2010-286981 A | 12/2010 |
| JP | 2011-003035 A | 1/2011 |
| JP | 2011-008726 A | 1/2011 |
| JP | 2011-023012 A | 2/2011 |
| JP | 2013-502640 A | 1/2013 |
| WO | 2011/022067 A1 | 2/2011 |

* cited by examiner

DISPLAY WITH CASE ELECTRICALLY CONNECTED TO GROUND

BACKGROUND OF THE INVENTION

Field of the Invention

The technique disclosed herein relates to a touch sensor panel and a display, and particularly relates to, for example, a touch sensor panel of projected capacitive type and a display equipped with a touch sensor panel.

Description of the Background Art

Various information processing apparatuses include a touch sensor panel that detects a touch of a pointer such as a finger to determine touch coordinates indicating a touched point. The recent information processing apparatuses commonly includes a display with a touch sensor panel fixed to its screen as a new user interface.

A touch sensor panel of projected capacitive type, which is a kind of capacitive type, can measure a slight change in the capacitance caused by a touch of a finger on a touch sensor in the panel and find coordinates indicative of the position of the touched point based on the measurements.

The touch sensor panel of projected capacitive type equipped with a built-in touch sensor can determine the position of the touched point on the surface of the touch sensor panel covered with, for example, a protective glass sheet having a thickness of about several millimeters.

The touch sensor panel of projected capacitive type covered with such a protective sheet has excellent robustness. Also, the touch sensor panel of projected capacitive type can detect a touch of, for example, a gloved hand. In addition, the touch sensor panel of projected capacitive type has no movable part, and therefore, has a long life.

The protective sheet of the touch sensor panel of projected capacitive type is a transparent resin substrate made of acrylic or polycarbonate, a glass substrate, or the like.

The protective glass cover on the touch sensor panel of projected capacitive type may be larger than the area occupied by the built-in touch sensor for measuring capacitance. Thus, the finished product can be excellent in design. In addition, such a structure allows ease of sealing the panel in a case of a display.

Unlike a conventional touch sensor panel of resistive film type or the like, the touch sensor panel of projected capacitive type is available for use with the potential for contact with, for example, rain, seawater, a beverage, or a chemical agent. In addition, the touch sensor panel of projected capacitive type is highly responsive to a touch of, for example, a gloved hand.

However, such a touch sensor panel needs be kept error-free to continue stable operation when coming into contact with, for example, moisture.

Examples of a touch sensor panel best suited to waterproof apparatuses include a highly water-resistant touch sensor panel disclosed in Japanese Patent Application Laid-Open No. 2009-276821 for mobile communication terminals or the like.

The touch sensor panel disclosed in Japanese Patent Application Laid-Open No. 2009-276821 is kept highly water-resistant in a case having an opening covered with a protective sheet. The touch sensor panel disclosed in Japanese Patent Application Laid-Open No. 2009-276821 is configured in a manner to provide a predetermined amount of spacing between the protective sheet and a detector of a display in the case.

The protective sheet on the touch sensor panel disclosed in Japanese Patent Application Laid-Open No. 2009-276821 is dented by a touch of a finger or the like. Consequently, the gap between the protective sheet and the detector of the display in the case deviates from the predetermined amount of spacing.

The point undergoing changes in capacitance is determined based on the deviation from the predetermined amount of spacing between the protective sheet and the detector of the display in the case. The position of the touched point is determined accordingly.

The flexibility of the protective sheet is a prerequisite to the touch sensor panel disclosed in Japanese Patent Application Laid-Open No. 2009-276821. Thus, the robustness of the touch sensor can suffer.

Touch sensor panels of surface capacitive coupling type, which is a kind of capacitive type, have conventionally been used. Such a touch sensor panel of surface capacitive coupling type includes a sensor electrode made of a transparent wiring material such as tin-doped indium oxide or indium tin oxide (ITO) and formed on the surface of the glass substrate, or, on the surface to be touched by a finger or the like.

No moisture on the area occupied by the built-in touch sensor is detected as a touch unless being conductively connected with the ground via a finger or the like. The touch sensor panel of surface capacitive coupling type thus has an advantage of being almost free from detection errors.

The sensor electrode of the touch sensor panel of surface capacitive coupling type is formed on the entire front surface of the glass substrate, and thus, this structure functions as one sensor as a whole. When the area occupied by the built-in touch sensor comes into contact with water or any other extremely high relative permittivity substance having, for example, a relative permittivity of 80, a potential equalization is still achieved via the substance.

Thus, the touch sensor panel undergoes changes in capacitance that are much smaller in the case of the contact with the high relative permittivity substance than in the case of a touch of a finger or the like. The above-mentioned changes in capacitance in the touch sensor panel coming into contact with the high relative permittivity substance are not detected as an input of positional information. The touch sensor panel of surface capacitive coupling type therefore is less likely to erroneously detect a touch when coming into contact with water.

The touch sensor panel of surface capacitive coupling type, however, includes wiring formed around the area for receiving an input of positional information such that an electric field can be applied evenly to the area occupied by the built-in touch sensor. The wiring is made of, for example, silver.

This wiring structure is somewhat inferior in robustness or design to the structure of the touch sensor panel of projected capacitive type.

In theory, the touch sensor panel of surface capacitive coupling type is unable to detect a plurality of points at the same time and to detect a touch of, for example, a gloved hand. As compared to the touch sensor panel of projected capacitive type, this touch sensor panel is of limited application.

The touch sensor panel of projected capacitive type includes a plurality of sensor electrodes located in the area for receiving an input of positional information. Various methods for measuring capacitance of the touch sensor panel of projected capacitive type have been developed. For example, a touch sensor panel of self capacitance type measures capacitance of each of the plurality of sensor electrodes, whereas a touch sensor panel of mutual capacitance type inputs an AC signal into one sensor electrode to obtain capacitance by measurement from another sensor electrode. The touch sensor panel of projected capacitive type is capable of detecting a plurality of points at the same time and detecting a touch of a gloved hand.

It is noted that a typical touch sensor panel of projected capacitive type includes a high-sensitivity measuring circuit that can measure, via the protective sheet, changes in capacitance caused by the pointer.

According to the method for measuring capacitance in the presence of a potential difference between a sensor electrode being the target of measurement and the adjacent wiring, the touch sensor panel measuring changes in capacitance in the area occupied by the built-in touch sensor may fail to distinguish changes caused by the contact with a substance such as water or any other extremely high relative permittivity substance having, for example, a relative permittivity of 80 from changes in capacitance caused by a touch of the pointer such as a finger. The touch sensor panel can possibly recognize an input of positional information in error when the area occupied by the built-in touch sensor comes into contact with, for example, a water droplet.

The touch sensor panel desirably minimizes detection errors by measuring capacitance in a manner to reduce changes in capacitance in the area occupied by the built-in touch sensor when coming into contact with a high relative permittivity substance and to accordingly achieve a potential equalization in the relevant area.

When coming into contact with such a high relative permittivity substance extending across the boundary between the area occupied by the built-in touch sensor and the surrounding area apart from the built-in touch sensor, however, the touch sensor panel can possibly recognize the capacitance coupled to, for example, the case of the display as a capacitance measured via the protective sheet and a water droplet.

The touch sensor panel measuring capacitance in the modified manner as mentioned above may fail to distinguish changes in capacitance caused by the contact with a high relative permittivity substance from changes in capacitance caused by a touch of the pointer such as a finger. This can result in a detection error.

SUMMARY OF THE INVENTION

The technique disclosed herein aims to minimize the chances that the contact with a high relative permittivity substance such as water will be erroneously detected as a touch.

A first aspect of the technique disclosed herein includes a touch sensor panel, a panel controller, a case, and a signal generation circuit. The touch sensor panel includes a touch sensor. The panel controller measures a capacitance of the touch sensor. The case accommodates a display, in which at least the touch sensor panel and the panel controller are disposed. The signal generation circuit is capable of applying an AC signal to a ground of the panel controller. The case is electrically connected to the ground of the panel controller. When the signal generation circuit applies the AC signal to the ground, the panel controller measures the capacitance of the touch sensor.

The first aspect of the technique disclosed herein can minimize the chances that the contact with a high relative permittivity substance such as water extending across the boundary between the touch sensor panel and the surrounding area will be erroneously detected as a touch.

These and other objects, features, aspects and advantages of the technique disclosed herein will become more apparent from the following detailed description when taken in conjunction with the accompanying drawings.

DESCRIPTION OF THE PREFERRED EMBODIMENTS

Preferred embodiments will be described below with reference to the drawings attached to the specifications.

Each drawing is merely a schematic illustration, and thus, images in different drawings may not accurately represent the relation between the size and the position, which can be changed as appropriate.

Similar constituent components are denoted by the same reference signs throughout, which holds true for the names and functions thereof. Thus, some of them will not be further elaborated.

In the following description, words indicating specific positions and directions, such as "above", "below", "side", "bottom", "front", and "back", are used for convenience of easy understanding of the preferred embodiments and are irrelevant to the actual implementation of the preferred embodiments.

First Preferred Embodiment

A display according a first preferred embodiment will now be described.

Configuration of Display

Figure 1:
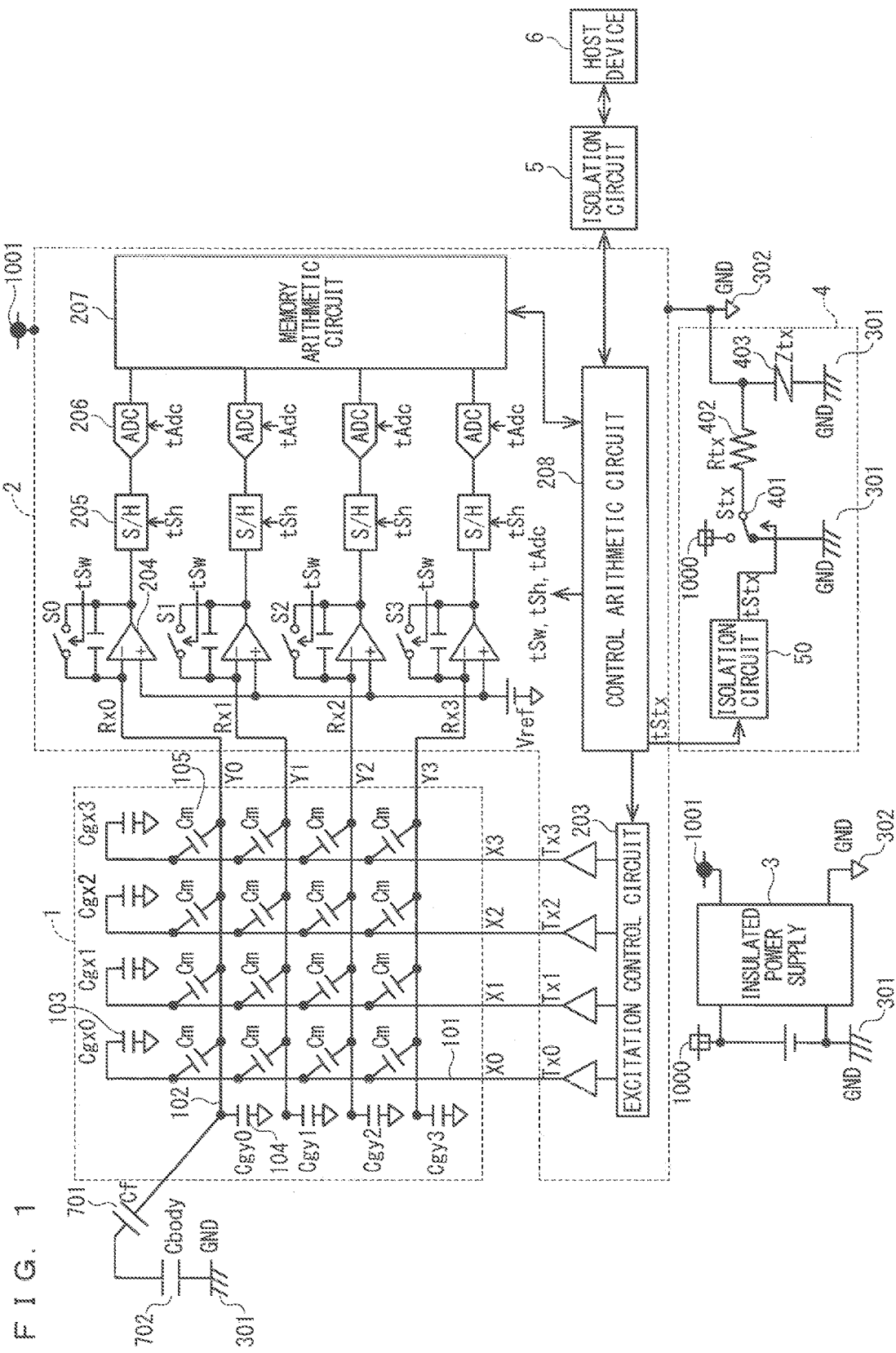
FIG. 1 schematically illustrates a configuration for providing a display according to one preferred embodiment equipped with a touch sensor panel.

FIG. 1 schematically illustrates a configuration for providing the display according to this preferred embodiment equipped with a touch sensor panel. FIG. 1 diagrammatically illustrates circuitry to be referred to in the following description and eliminates a typical component such as a bypass capacitor or a power supply protection circuit.

As illustrated in FIG. 1, the display equipped with a touch sensor panel includes a touch sensor panel 1, a panel controller 2, an insulated power supply circuit 3, a signal generation circuit 4, a signal isolation circuit 5, and a host device 6. The host device 6 is conceivably a common type of personal computer or a processor board, namely, a board for self-assembly.

The touch sensor panel 1 is a panel equipped with a built-in touch sensor for detecting a touch. The touch sensor panel 1 is connected to the panel controller 2. The touch sensor panel 1 includes an X touch sensor group 101 and a Y touch sensor group 102.

The X touch sensor group 101 extends vertically in the touch sensor panel 1 and X touch sensors thereof are arranged side by side horizontally in the touch sensor panel 1.

The Y touch sensor group 102 extends horizontally in the touch sensor panel 1 and Y touch sensors thereof are arranged side by side vertically in the touch sensor panel 1.

The X touch sensor group 101 lies at right angles to the Y touch sensor group 102. For easy understanding of the description, assume that, as illustrated in FIG. 1, there are two sets of four sensors: one including touch sensors X0, X1, X2, and X3, and the other including touch sensors Y0, Y1, Y2, and Y3.

Each touch sensor has a self capacitance and a mutual capacitance Cm. The self capacitance is a parasitic capacitance between the touch sensor panel 1 and a common electrode of a liquid crystal display (LCD) with the touch sensor panel 1 fixed thereto. FIG. 1 shows a self capacitance 103 of the X touch sensor group 101 and a self capacitance 104 of the Y touch sensor group 102.

Specifically, FIG. 1 shows self capacitances Cgx0, Cgx1, Cgx2, and Cgx3, each of which is the self capacitance 103 of the X touch sensor group 101. FIG. 1 also shows self capacitances Cgy0, Cgy1, Cgy2, and Cgy3, each of which is the self capacitance 104 of the Y touch sensor group 102.

The mutual capacitance Cm is a capacitance between the X touch sensors and the Y touch sensors.

In addition, a touch of a pointer 7 such as a finger or a stylus is illustrated with a coupling capacitance 701 present between the protective sheet and the touch sensor and connected to the touch sensor Y0, a body capacitance 702, and an external GND 301. The "external GND" hereinafter refers to a ground potential directly connected to the ground of the host device 6 through, for example, a cable (not shown).

The touch sensors of the touch sensor panel 1 are connected to the panel controller 2 through, for example, flexible printed circuits (FPCs).

The panel controller 2 includes an excitation control circuit 203, integrator amplifiers 204, sample-and-hold circuits 205, A/D converter circuits 206, a memory arithmetic circuit 207, and a control arithmetic circuit 208.

The excitation control circuit 203 is connected to the X touch sensor group 101 and applies an excitation voltage to the X touch sensors. That is to say, the excitation control circuit 203 applies excitation voltages Tx0, Tx1, Tx2, and Tx3 to the touch sensors X0, X1, X2, and X3, respectively.

The integrator amplifiers 204 are connected to the Y touch sensor group 102 and convert an output current from the Y touch sensor group 102 into a voltage. Specifically, each of the integrator amplifiers 204 converts an output current from the corresponding one of the touch sensors Y0, Y1, Y2, and Y3 into a voltage.

Each of the sample-and-hold circuits 205 is connected to the corresponding one of the integrator amplifiers 204 and holds the output from the relevant integrator amplifier 204 at a specific timing.

Each of the A/D converter circuits 206 is connected to the corresponding one of the sample-and-hold circuits 205 and converts the output from the relevant sample-and-hold circuit 205 into a digital signal.

The memory arithmetic circuit 207 is connected to the A/D converter circuits 206 and stores the output from the A/D converter circuits 206.

The capacitance is obtained by measurement from the Y touch sensor group 102 through the use of the integrator amplifiers 204, the sample-and-hold circuits 205, the A/D converter circuits 206, and the memory arithmetic circuit 207. That is to say, the capacitance is obtained by measurement from the touch sensors Y0, Y1, Y2, and Y3.

The control arithmetic circuit 208 is connected to the excitation control circuit 203, the memory arithmetic circuit 207, the signal isolation circuit 5, and the signal generation circuit 4. The control arithmetic circuit 208 controls the memory arithmetic circuit 207, and furthermore, controls sample-and-hold circuits 205 and the A/D converter circuits 206.

The control arithmetic circuit 208 finds coordinates of a touched point based on the capacitance obtained by measurement from the Y touch sensor group 102.

Then, the control arithmetic circuit 208 outputs, to the host device 6, touch information including the coordinates.

The panel controller 2 is connected to the signal isolation circuit 5 and, accordingly, to the host device 6. The signal isolation circuit 5 is a photocoupler or any other circuit that transmits signals while remaining electrically isolated.

The panel controller 2 is connected to the host device 6 through, for example, a connector (not shown) or a cable (not shown).

The panel controller 2 outputs, to the host device 6, the touch information including both the presence or absence of a touch and touch coordinates. The panel controller 2 can communicate with the host device 6 using any device, such as a universal serial bus (USB), an inter-integrated circuit (I2C), or a universal asynchronous receiver transmitter (UART).

The insulated power supply circuit 3 is connected to an external power supply 1000 and the external GND 301. The insulated power supply circuit 3 generates an internal power supply 1001 of the panel controller 2 and an internal GND 302 of the panel controller 2 based on the external power supply 1000 and the external GND 301. The "external power supply" hereinafter refers to a power supplied from the host device 6 through, for example, a cable (not shown). The "internal power supply" and the "internal GND" hereinafter respectively refer to a power supply and a ground potential generated by the insulated power supply circuit 3.

The insulated power supply circuit 3 is, for example, SN6505 manufactured by Texas Instruments Incorporated or any other circuit including varying combinations of a control IC, a transformer, a switching diode, a capacitor, a regulator IC, and the like. The voltage of the external power supply 1000 and the voltage of the internal power supply 1001 are set based on, for example, a power supply voltage required by the panel controller 2 and a power supply voltage required by the host device 6. The voltage value of the external power supply 1000 may be different from the voltage value of the internal power supply 1001.

The signal generation circuit 4 is a circuit that generates an AC signal with reference to the external power supply 1000 and the external GND 301 being the ground point. The signal generation circuit 4 includes a signal isolation circuit 50 and a switch 401. The signal isolation circuit 50 is a photocoupler or any other circuit that transmits signals while remaining electrically isolated. The signal generation circuit 4 is connected to the panel controller 2 through the signal isolation circuit 50.

The switch 401 is controlled according to a control timing signal tStx input from the panel controller 2 through the signal isolation circuit 50. The control timing signal tStx is generated in the panel controller 2. The external power supply 1000 provide a rectangular wave via the switch 401 to the internal GND 302 insulated from the external GND 301.

The switch 401 is not a mechanical switch but a semiconductor element. When the control timing signal tStx is set at an H voltage (a high-level voltage), the switch 401 turns on, that is, the switch 401 becomes connected to the external power supply 1000.

The signal generation circuit 4 also includes a resistor 402. The resistor 402 is aimed at protecting the switch 401 and regulates the output current in the switch 401.

In addition, the signal generation circuit 4 includes a varistor 403. The varistor 403 is aimed at protecting the touch sensor panel 1, the panel controller 2, and the switch 401 from electrostatic discharge (ESD).

The display is operable without the resistor 402 and the varistor 403.

The external power supply 1000 and the external GND 301 provide a voltage amplitude, which becomes an excitation voltage for use in the measurement of the capacitance between the touch sensor panel 1 and the pointer 7. The capacitance is desirably measured with a maximum allowable amount of charge Q within the dynamic ranges of the integrator amplifiers 204 and the other circuits disposed downstream thereof. Thus, the voltage of the external power supply 1000 may be boosted while the switch 401 is on.

Figure 2:
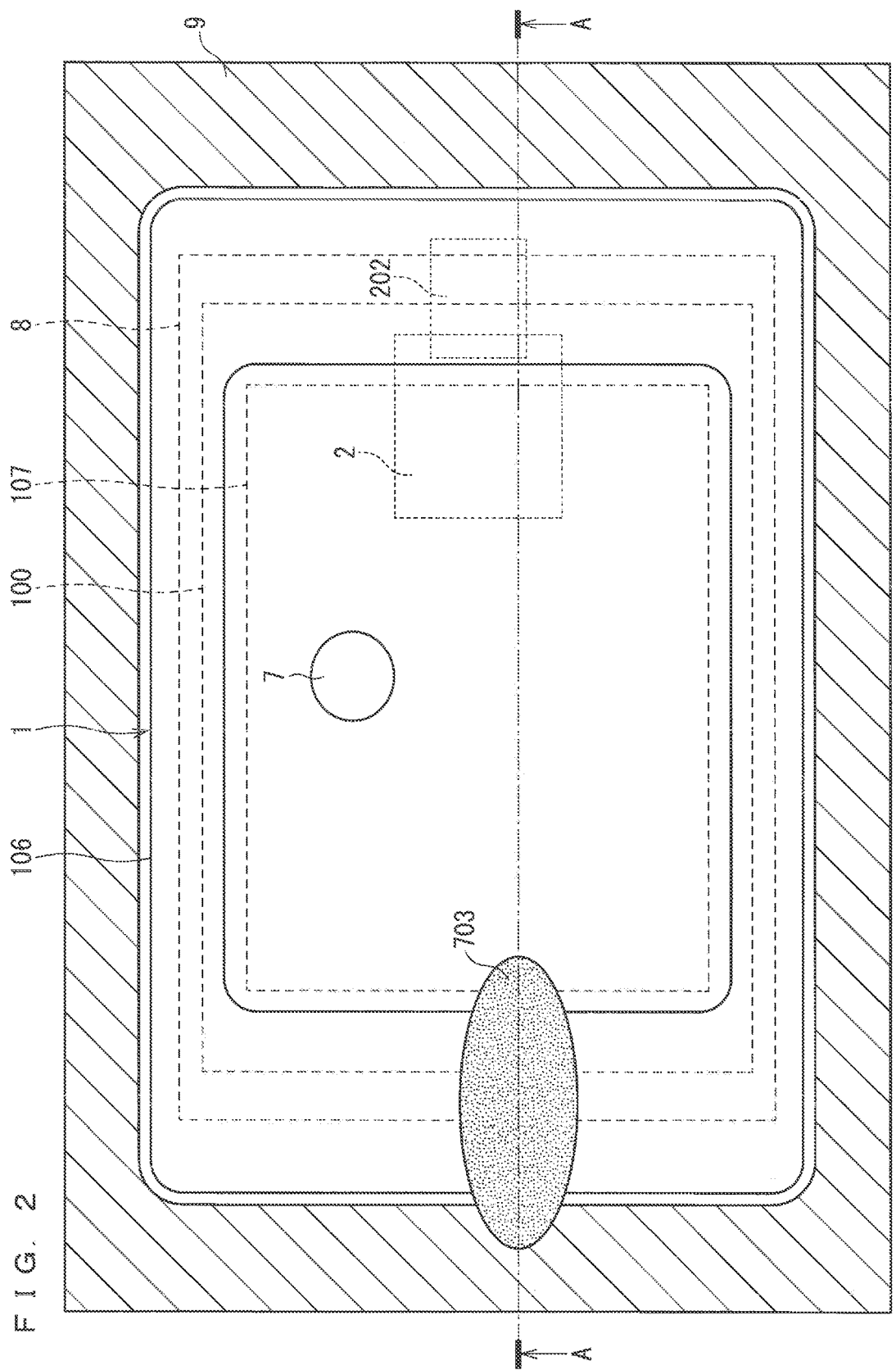
FIG. 2 is a schematic plan view of a configuration of the display shown in FIG. 1.

FIG. 2 is a schematic plan view of a structure of the display shown in FIG. 1. FIG. 2 illustrates the display viewed from its touch surface side.

Figure 3:
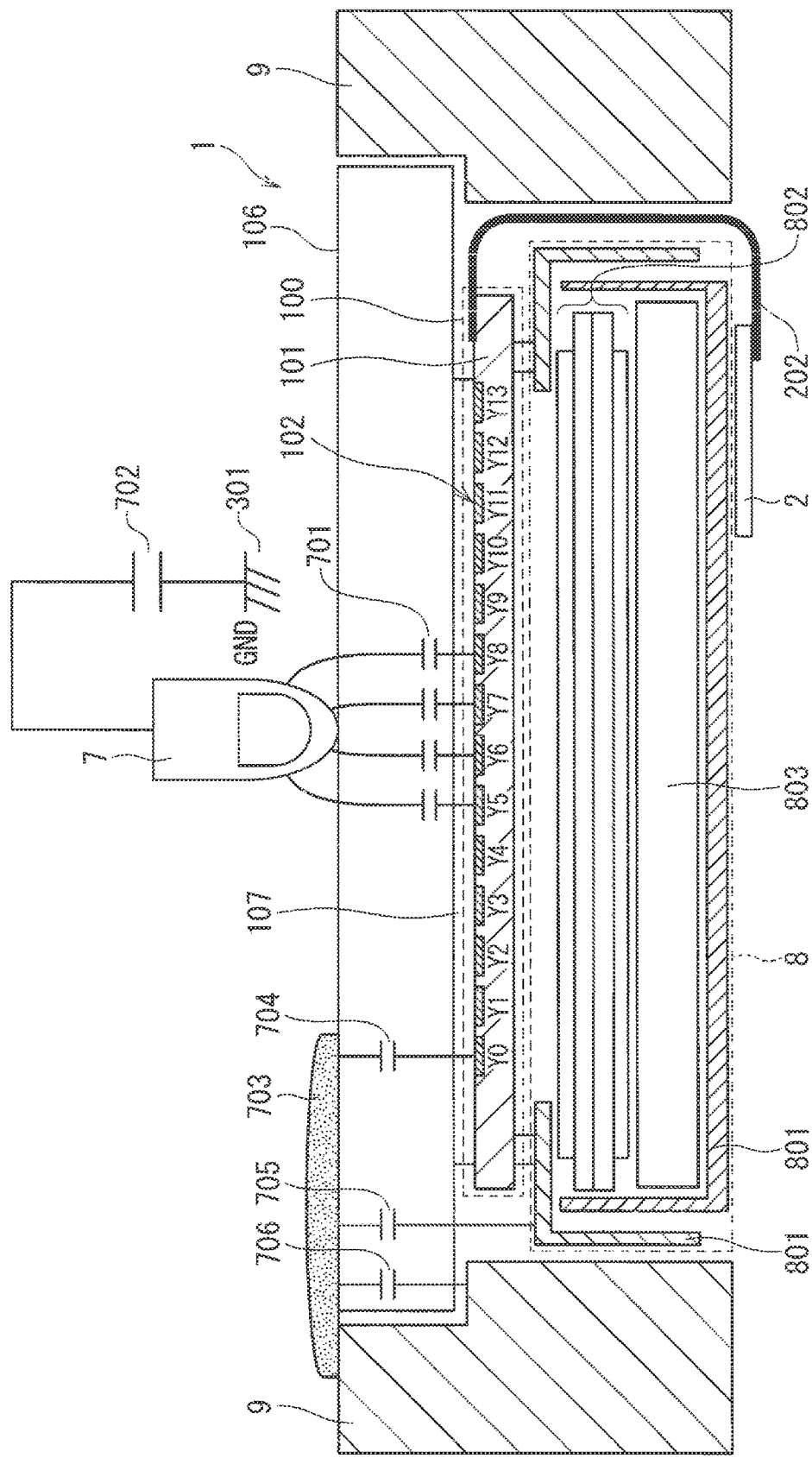
FIG. 3 is a schematic cross-sectional view of the configuration of the display shown in FIG. 1.

FIG. 3 is a schematic cross-sectional view of a structure of the display shown in FIG. 1. FIG. 3 is a cross-sectional view taken along the line A-A of FIG. 2.

As illustrated in FIG. 2, the display equipped with a touch sensor panel includes the touch sensor panel 1, the panel controller 2, and an FPC 202 connected therebetween. The display with a built-in touch sensor panel also includes an apparatus case 9 surrounding the touch sensor panel 1, the panel controller 2, and the FPC 202.

The touch sensor panel 1 includes a protective sheet 106 being a transparent substrate, a touch sensor 100, and a transparent adhesive member 107. The touch sensor 100 includes the X touch sensor group 101 and the Y touch sensor group 102. The transparent member 107 bonds the protective sheet 106 and the touch sensor 100 together.

The touch sensor panel 1 is bonded to an image display liquid crystal module 8 located thereunder by, for example, a double-sided adhesive tape. The touch sensor panel 1 and the image display liquid crystal module 8 are fixed to the apparatus case 9.

FIGS. 2 and 3 additionally show the pointer 7 such as a finger and a high relative permittivity substance 703 such as water. The pointer 7 is in contact with the protective sheet 106 lying right on the touch sensor 100. The high relative permittivity substance 703 extends across the boundary between the protective sheet 106 lying right on the touch sensor 100 and the apparatus case 9.

The image display liquid crystal module 8 includes a liquid crystal panel 802, a backlight 803 located below the liquid crystal panel 802, and a frame 801 made of metal and surrounding the liquid crystal panel 802 and the backlight 803.

The liquid crystal panel 802 is a lamination of a glass substrate, a liquid crystal layer, a polarizing filter, and the like.

The GND of the image display liquid crystal module 8 and the apparatus case 9 are commonly connected to the system GND of the host device 6 or the ground point of the whole of the apparatus. With reference to FIG. 1, the external GND 301 is the ground point. The frame 801 is part of the GND of the image display liquid crystal module 8. It is noted that a general GND connection is established at the ground point of the whole of the apparatus.

In this preferred embodiment, meanwhile, the GND of the image display liquid crystal module 8 and the apparatus case 9 are connected to the internal GND 302 of the panel controller 2 shown in FIG. 1. It is noted that this preferred embodiment adopts this connection as the GND connection.

Figure 4:
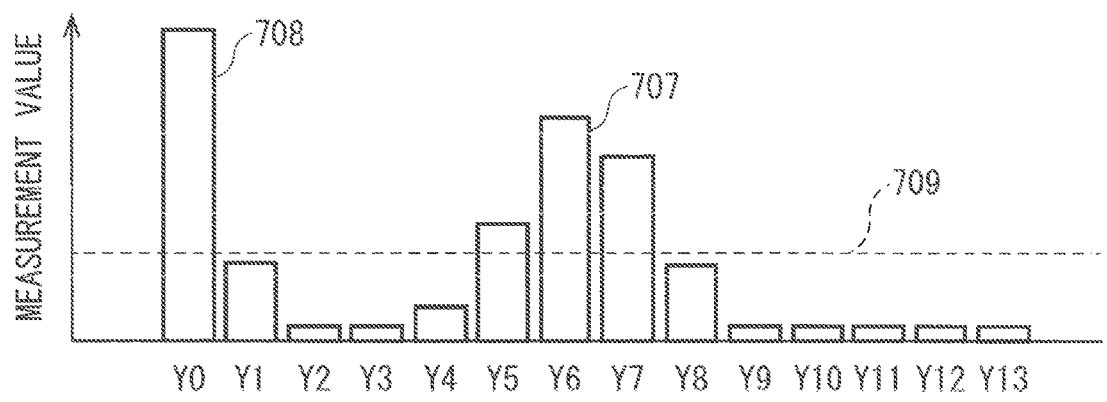
FIG. 4 is a graph showing measurement values of the capacitance of a Y touch sensor group under the condition that a general GND connection is established.
Figure 5:
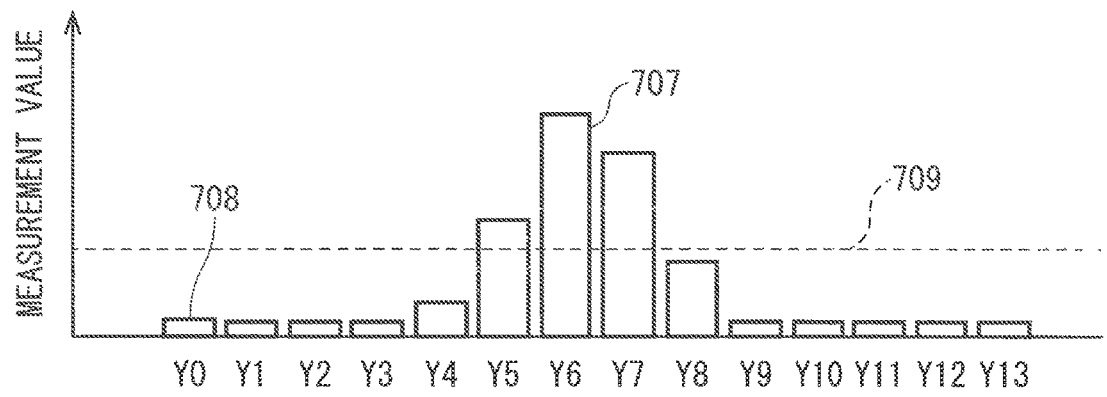
FIG. 5 is a graph showing measurement values of the capacitance of the Y touch sensor group under the condition that a GND connection in the one preferred embodiment is established.

FIGS. 4 and 5 are graphs each showing results of a measurement of the capacitance of the Y touch sensor group 102 in the structure shown in FIG. 3.

FIG. 4 shows measurement values of the capacitance of the Y touch sensor group 102 under the condition that the general GND connection is established. Y0 to Y13 shown in FIG. 4 correspond respectively to the touch sensors of the Y touch sensor group 102 shown in FIG. 3.

Under the condition that the general GND connection is established, a coupling capacitance 706 associated with the apparatus case 9 having a different potential, a coupling capacitance 705 associated with the frame 801 having a different potential, and a coupling capacitance 704 associated with the touch sensor panel 1 are measured via the high relative permittivity substance 703 and represented as a capacitance 708, which exceeds a threshold value 709 as indicated by Y0 in FIG. 4.

FIG. 5 shows measurement values of the capacitance of the Y touch sensor group 102 under the condition that the GND connection in this preferred embodiment is established. Y0 to Y13 shown in FIG. 5 correspond respectively to the touch sensors of the Y touch sensor group 102 shown in FIG. 3.

Under the condition that the GND connection in this preferred embodiment is established, the capacitance measured via the high relative permittivity substance 703 does not exceed the threshold value 709 as indicated by Y0 shown in FIG. 5.

Operation of Display

With reference to FIGS. 6 to 10, the following will describe an operation performed by the display according to this preferred embodiment equipped with a touch sensor panel.

Figure 6:
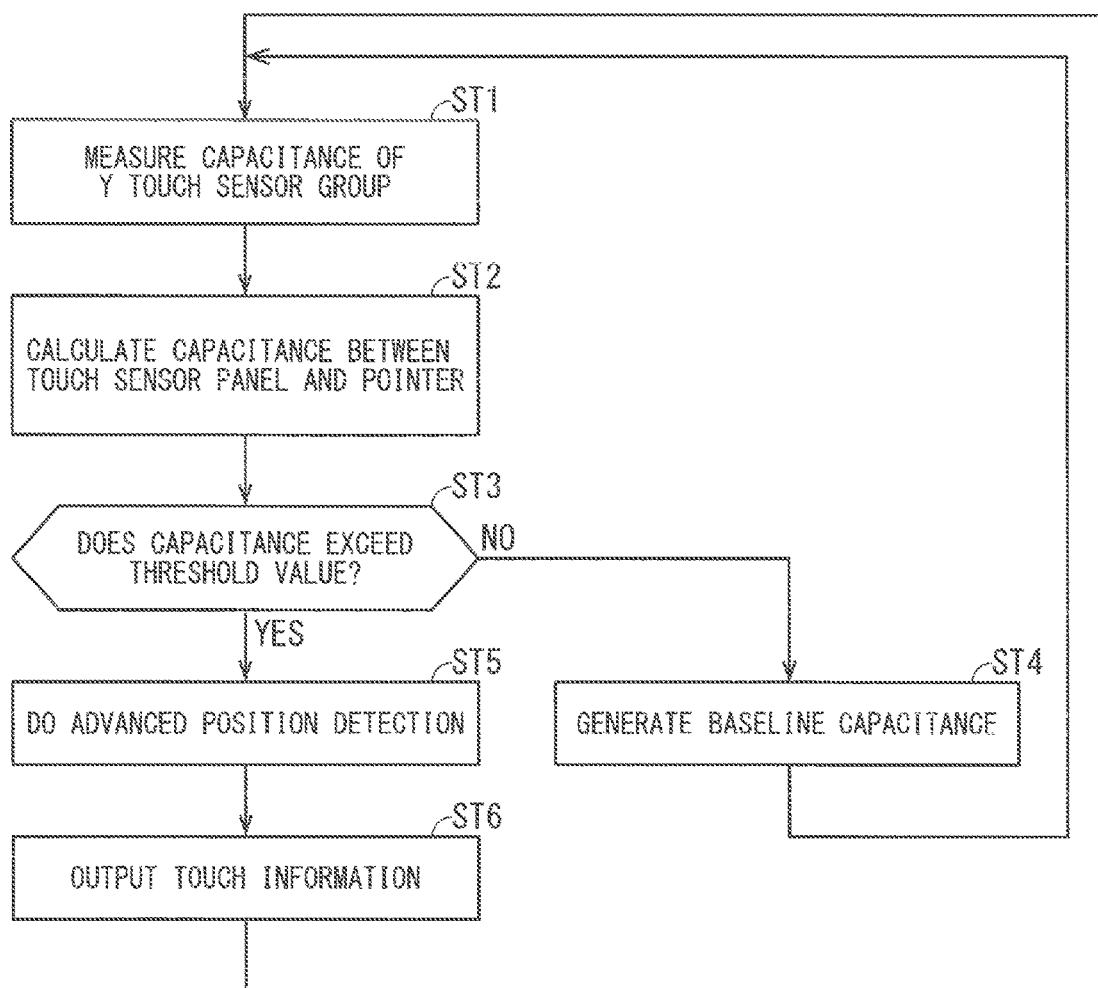
FIG. 6 is a flowchart illustrating a basic operation of the display according to the one preferred embodiment equipped with a touch sensor panel.
Figure 7:
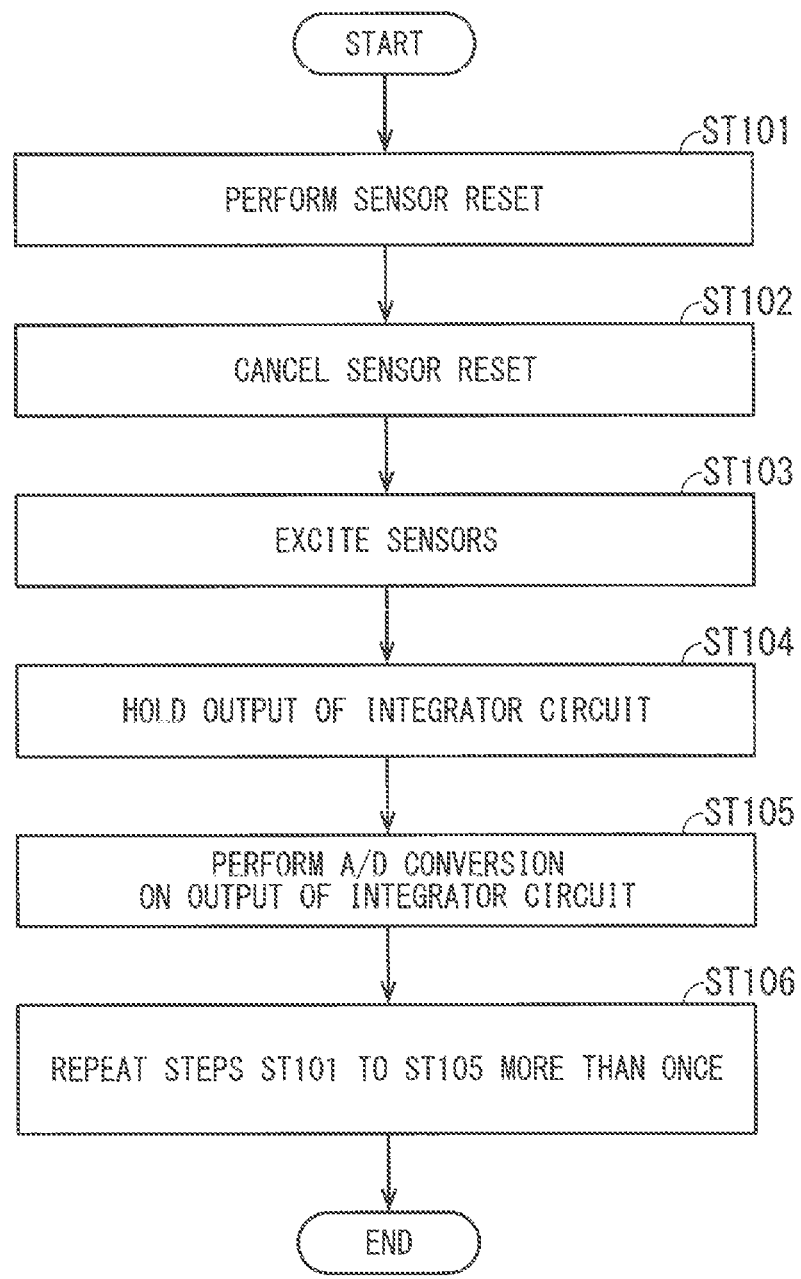
FIG. 7 is a flowchart illustrating an operation in Step ST1 performed by the display according to the one preferred embodiment equipped with a touch sensor panel.
Figure 8:
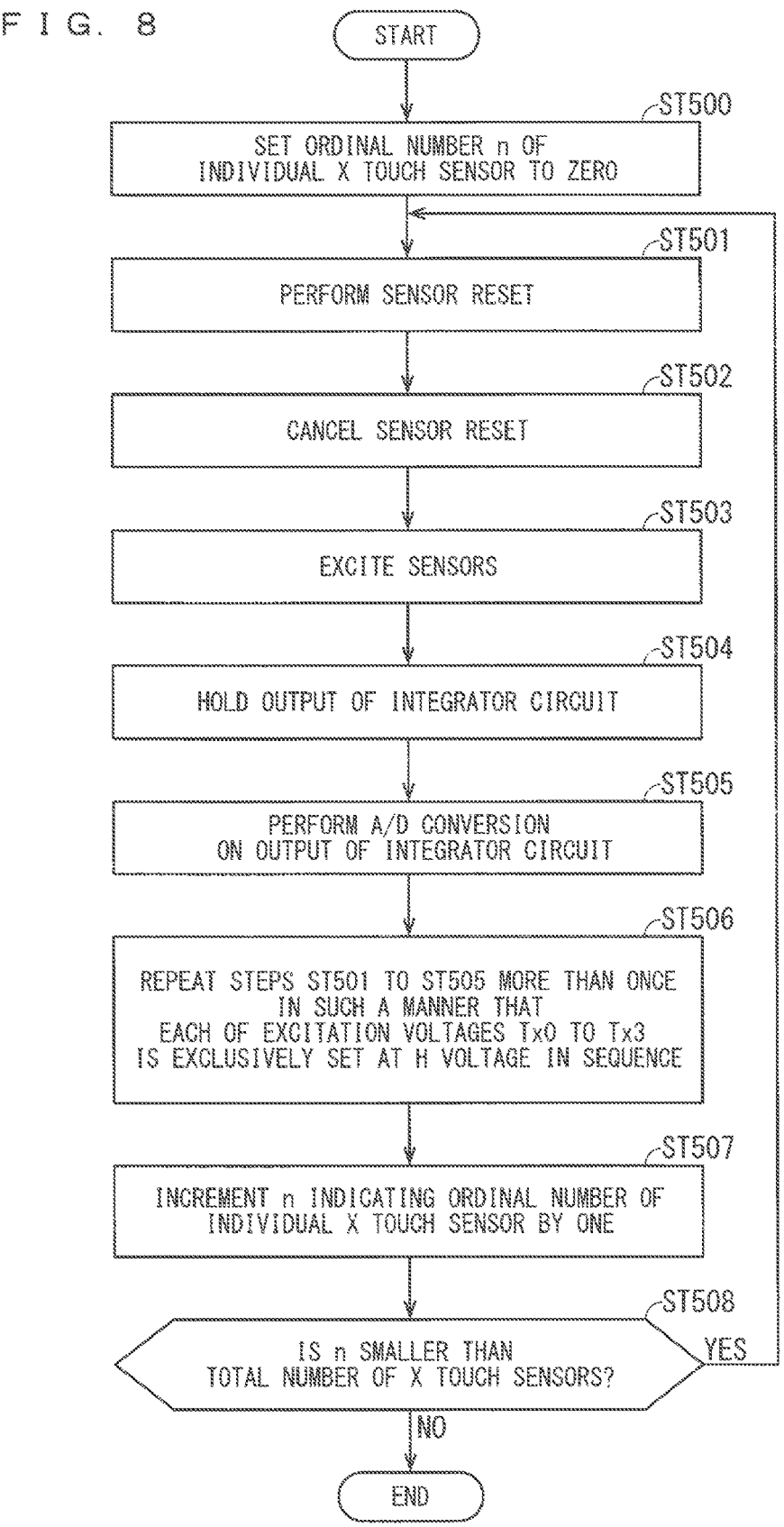
FIG. 8 is a flowchart illustrating an operation in Step ST5 performed by the display according to the one preferred embodiment equipped with a touch sensor panel.

Each of FIGS. 6 to 8 is a flowchart illustrating an operation performed by the display according to this preferred embodiment equipped with a touch sensor panel.

The flowchart of FIG. 6 illustrates a basic operation performed by the touch sensor panel and starting with Step ST1. After Step ST4 or ST6 is performed, Step ST1 is performed again. This operation is repeatedly performed.

FIG. 7 is a flowchart illustrating, in detail, the operation in Step ST1 of FIG. 6. FIG. 8 is a flowchart illustrating, in detail, the operation in Step 5 of FIG. 6.

The operation illustrated in FIG. 6 will now be described. The following operation is mainly performed in the control arithmetic circuit 208 shown in FIG. 1.

In Step ST1, the capacitance of the Y touch sensor group 102 is measured.

Then, in Step ST2, the difference between the measured capacitance and a reference capacitance, namely, a baseline capacitance is calculated. The difference is calculated as the capacitance between the touch sensor panel 1 and the pointer 7.

The reference capacitance measured in advance, namely, the baseline capacitance is the capacitance of the touch sensor panel 1 with no touch of the pointer 7.

Then, in Step ST3, it is determined whether a capacitance 707 between the touch sensor panel 1 and the pointer 7 exceeds the threshold value 709 as shown in FIGS. 4 and 5. The threshold value 709 is for determining the presence or absence of a touch.

If the capacitance between the touch sensor panel 1 and the pointer 7 does not exceed the threshold value 709, that is, if "No" in Step ST3 of FIG. 6, the absence of a touch is determined. Subsequently, in Step ST4, the latest baseline capacitance is generated based on the baseline capacitance and the measured capacitance between the touch sensor panel 1 and the pointer 7. Then, the operation returns to Step ST1.

If the capacitance between the touch sensor panel 1 and the pointer 7 exceeds the threshold value 709, that is, if "Yes" in Step ST3 of FIG. 6, the presence of a touch is determined. Then, the operation proceeds to Step ST5.

Then, in Step ST5, advanced position detection is done in the common mutual capacitance mode based on the capacitance between the touch sensor panel 1 and the pointer 7.

Then, in Step ST6, the touch information indicative of both the presence or absence of a touch and touch coordinates is output to the host device 6 based on the detection result obtained in Step ST5. Here, the touch information on the presence or absence of a touch indicates the presence of a touch.

The operation above will now be described in greater detail.

Figure 9:
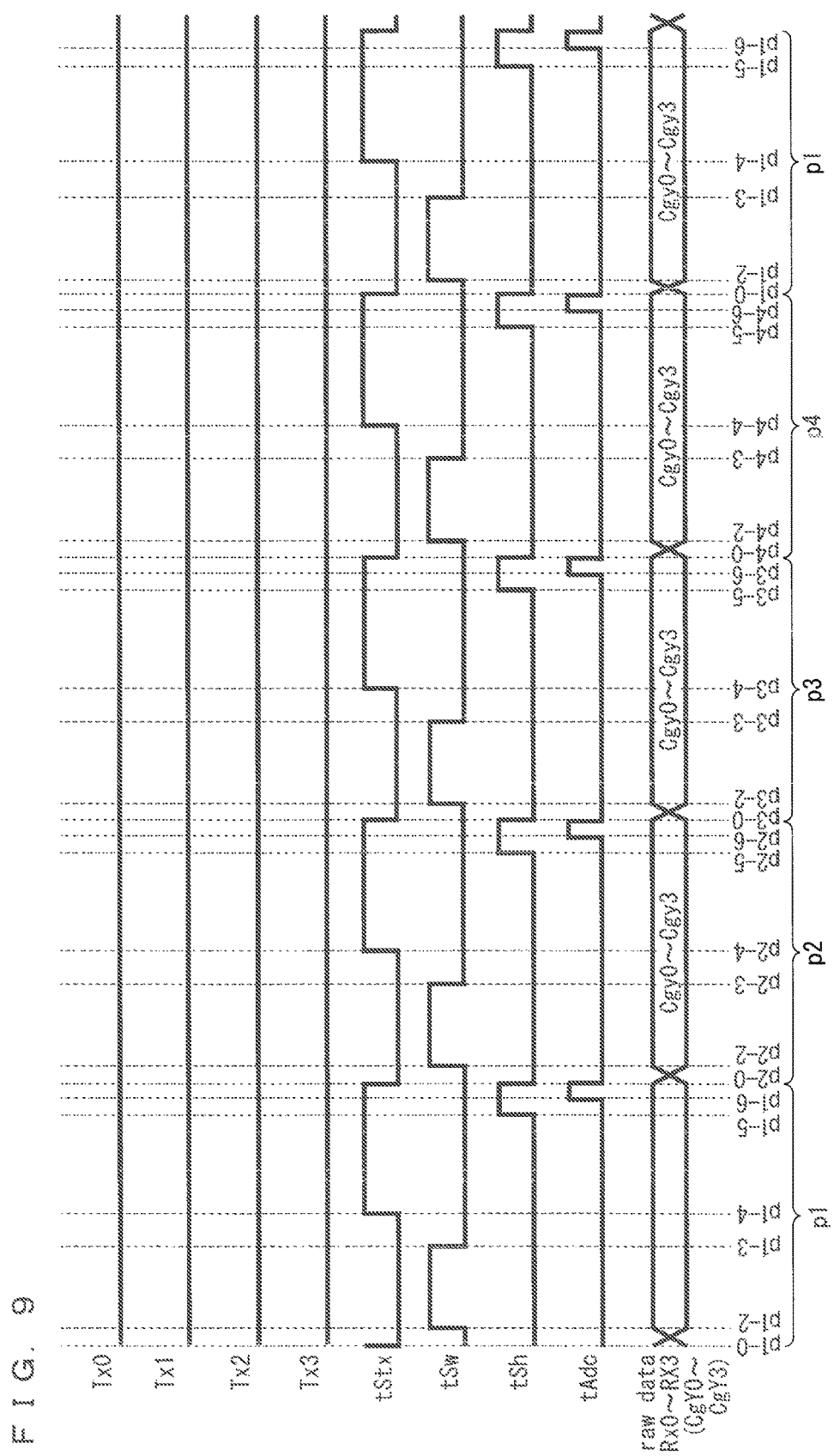
FIG. 9 is a timing chart corresponding to the flowchart of FIG. 7.
Figure 10:
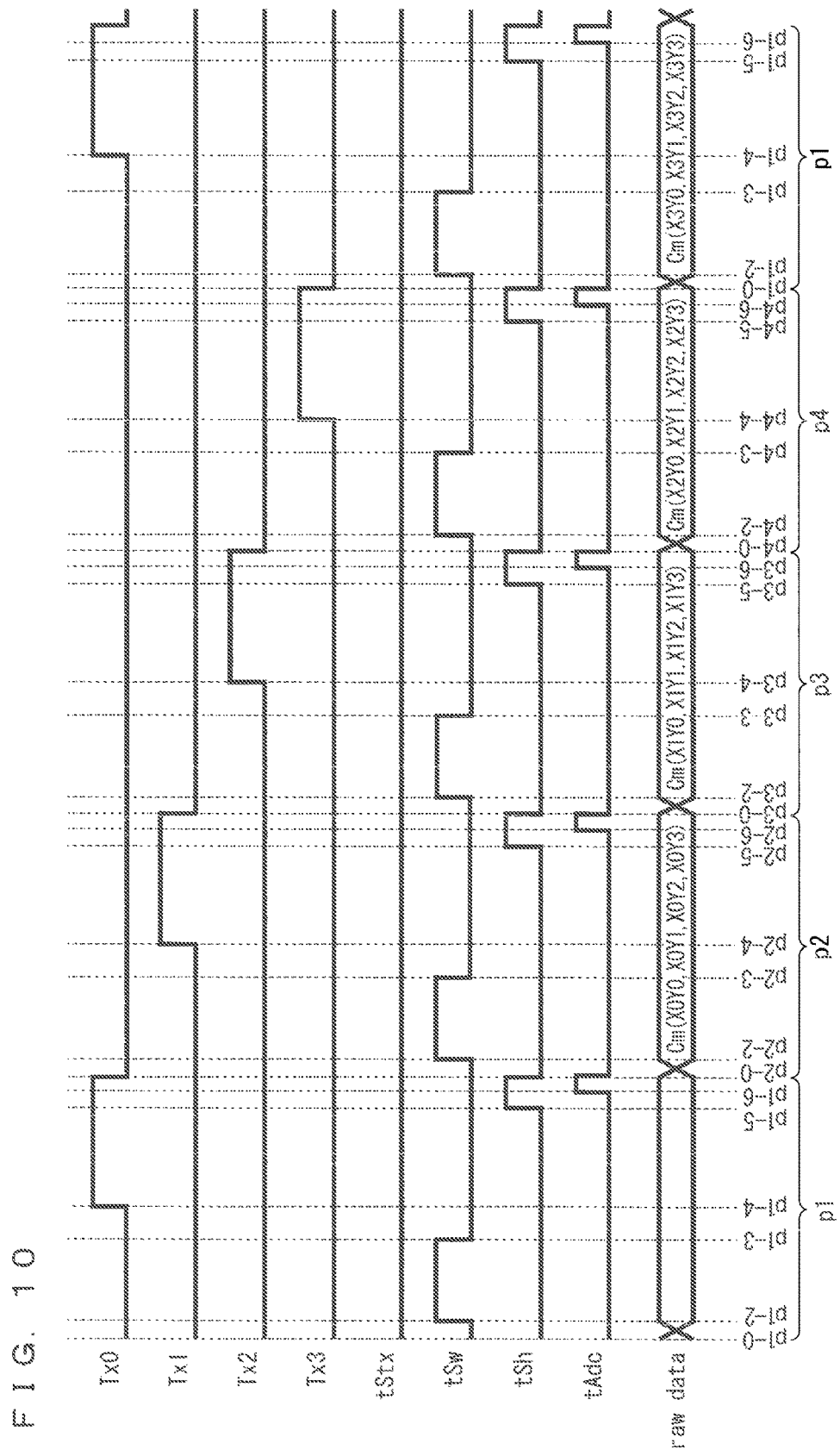
FIG. 10 is a timing chart corresponding to the flowchart of FIG. 8.

FIG. 9 is a timing chart corresponding to the flowchart of FIG. 7. FIG. 10 is a timing chart corresponding to the flowchart of FIG. 8.

The capacitance of the Y touch sensor group 102 is measured in Step ST1 of FIG. 6 through the use of an excitation voltage supplied from the internal GND 302 shown in FIG. 1. The excitation voltage from the internal GND 302 is obtained when the signal generation circuit 4 is in action. The capacitance between the touch sensor panel 1 and the pointer 7 is measured accordingly.

The excitation voltage is based on the external GND 301. All of the touch sensors, the panel controller 2, the GND of the image display liquid crystal module 8, and the apparatus case 9 are simultaneously excited at the same potential.

None of the excitation voltages Tx0, Tx1, Tx2, and Tx3 of the excitation control circuit 203 is boosted during the operation.

The timing chart of FIG. 9 shows five cycles of the control timing signal tStx, namely, cycles p1, p2, p3, p4, and p1. The output of the A/D converter circuits 206, in other words, the raw data in FIG. 9 varies with the fall time of a sampling timing tAdc, with a data update lagging one cycle behind.

The capacitance measurement operation per se is completed in each cycle. Thus, the operation in one cycle will be solely described below.

Step ST1 of FIG. 6 will now be described with reference to the flowchart of FIG. 7.

Each cycle of the capacitance measurement operation is divided into steps of performing a sensor reset (Step ST101), cancelling the sensor reset (Step ST102), exciting the sensors (Step ST103), holding an output of an integrator circuit (Step ST104), and performing an A/D conversion on the output of the integrator circuit (Step ST105).

Firstly, in Step ST101, a sensor reset is performed. That is to say, the excitation voltages Tx0, Tx1, Tx2, and Tx3 of the excitation control circuit 203 are fixed to an L voltage, namely, a low-level voltage. The L voltage is denoted by VoL.

The switch 401 is turned off. At this time, the control timing signal tStx is at the L voltage. This state is shown in p1-0 of FIG. 9.

The integrator amplifiers 204 are reset. At this time, a control signal tSw in the individual integrator amplifier 204 is at the H voltage. This state is shown in p1-2 of FIG. 9. Switches S0, S1, S2, and S3 of the respective integrator amplifiers 204 are all turned on.

The touch sensors X0, X1, X2, and X3 are charged at the excitation voltages Tx0, Tx1, Tx2, and Tx3, respectively.

The touch sensors Y0, Y1, Y2, and Y3 are charged at a Vref voltage.

The individual mutual capacitance Cm is charged at Vref voltage—excitation voltage (VoL), and thus, the individual integrator amplifier 204 can integrate, with respect to time, only the movement of charge caused by excitation.

Then, in Step ST102, the sensor reset is canceled. That is to say, the reset performed on the integrator amplifiers 204 is canceled. At this time, the control signal tSw in the individual integrator amplifier 204 is at the L voltage, and the switches S0, S1, S2, and S3 of the respective integrator amplifiers 204 are all tuned off. This state is shown in p1-3 of FIG. 9.

Then, in Step ST103, the sensors are excited. That is to say, the switch 401 is turned on. At this time, the control timing signal tStx is at the H voltage. This state is shown in p1-4 of FIG. 9. The signal generation circuit 4 excites the potential of the internal GND 302 with the use of the external power supply 1000 with reference to the external GND 301. That is to say, the signal generation circuit 4 applies an AC signal to the internal GND 302, which is the ground of the panel controller 2.

Then, in Step ST104, the output of the integrator circuit is held. That is to say, a control signal tSh in the individual sample-and-hold circuit 205 is set at the H voltage after the output is stabilized. This state is shown in p1-5 of FIG. 9. Then, the individual sample-and-hold circuit 205 is switched to a hold state.

Then, in Step ST105, an A/D conversion is performed on the output of the integrator circuit. That is to say, an A/D conversion is performed at the timing at which a sampling signal tAdc in the individual A/D converter circuit 206 is set at the H voltage after the output of the integrator circuit is held. This state is shown in p1-6 of FIG. 9. The A/D-converted output is held until the next A/D conversion.

In FIG. 1, the A/D converter circuits 206 are disposed so as to correspond respectively to a measurement line Rx0 for transferring an output from the touch sensor Y0, a measurement line Rx1 for transferring an output from the touch sensor Y1, a measurement line Rx2 for transferring an output from the touch sensor Y2, and a measurement line Rx3 for transferring an output from the touch sensor Y3.

In general, a frequency at which the capacitance is to be measured, or, 1/tStx being the inverse of the control timing signal tStx is in the range of 10 kHz to several hundred kHz. Such a frequency is substantially low with respect to the maximum A/D conversion rate achieved by a semiconductor circuit.

Thus, a fewer number of A/D converter circuits 206 will suffice when a high-speed A/D conversion is performed on the hold output of the individual sample-and-hold circuit 205 by time division.

Then, in Step ST106, Steps ST101 to ST105 are repeated more than once for stable measurement. Averaging of the measurement values obtained in Steps ST101 to ST105 improves the signal-to-noise (S/N) ratio and stabilizes the operation accordingly.

The frequency at which the capacitance is to be measured is preferably selected in such a manner that the presence or absence of a touch is determined in 10 ms or less at a time, thereby controlling a margin of error between the measurement and the movement of the pointer 7 such as a finger.

Step ST5 of FIG. 6 will now be described with reference to the timing chart of FIG. 10. If the presence of a touch is determined in Step ST3 of FIG. 6, Step ST5 is performed.

In Step ST5, the capacitance is measured in the common mutual capacitance mode. In the mutual capacitance mode, the capacitance corresponding to the individual mutual capacitance Cm between the X touch sensors and the Y touch sensors is obtained as two-dimensional data. This enables multi-touch identification, where three or more touched points can be easily identified.

Step ST5 may be eliminated by an architecture which enables measurement of the capacitance of the X touch sensor group 101 in Step ST1, with a single touch detection application running.

The timing chart of FIG. 10 shows five cycles of the control timing signal tStx, namely, cycles p1, p2, p3, p4, and p1. In FIG. 10, p1 to p4 correspond to the respective mutual capacitances Cm of the touch sensors X0, X1, X2, and X3. The difference in capacitance being a load accounts for the difference between the cycle p1 of FIG. 9 and the cycle p1 of FIG. 10. The cycle p1 of FIG. 9 corresponds to, for example, several dozen kHz, whereas the cycle p1 of FIG. 10 corresponds to, for example, several hundred kHz.

In p1, mutual capacitances X0Y0, X0Y1, X0Y2, X0Y3 that intersect X0 are measured.

In p2, mutual capacitances X1Y0, X1Y1, X1Y2, and X1Y3 that intersect X1 are measured.

In p3, mutual capacitances X2Y0, X2Y1, X2Y2, and X2Y3 that intersect X2 are measured.

In p4, mutual capacitances X3Y0, X3Y1, X3Y2, and X3Y3 that intersect X3 are measured.

The A/D-converted measurement results in p1 to p4 are held with a time lag of one cycle.

As in FIG. 9, the capacitance measurement operation per se is completed in each cycle. Thus, the operation in one cycle will be solely described below.

Each cycle of the capacitance measurement operation is divided into steps of performing a sensor reset (Step ST501), cancelling the sensor reset (Step ST502), exciting the sensors (Step ST503), holding an output of the integrator circuit (Step ST504), and performing an A/D conversion on the output of the integrator circuit (Step ST505).

Firstly, in Step ST500, the ordinal number of the individual X touch sensor is set as indicated below.

n=0

Then, in Step ST501, a sensor reset is performed. That is to say, the excitation voltages Tx0, Tx1, Tx2, and Tx3 of the excitation control circuit 203 are fixed to the L voltage.

The switch 401 is turned off. At this time, the control timing signal tStx is at the L voltage. This state is shown in p1-0 of FIG. 10.

The integrator amplifiers 204 are reset. At this time, the control signal tSw in the individual integrator amplifier 204 is at the H voltage. This state is shown in p1-2 of FIG. 10. The switches S0, S1, S2, and S3 of the respective integrator amplifiers 204 are all tuned on.

Then, in Step ST502, the sensor reset is canceled. That is to say, the reset performed on the integrator amplifiers 204 is canceled. At this time, the control signal tSw in the individual integrator amplifier 204 is at the L voltage, and the switches S0, S1, S2, and S3 of the respective integrator amplifiers 204 are all turned off. This state is shown in p1-3 of FIG. 10.

Then, in Step ST503, the sensors are excited. The switch 401 is kept off. At this time, the control timing signal tStx is at the L voltage.

Of the excitation voltages of the excitation control circuit 203, the excitation voltage corresponding to the ordinal number is set at the H voltage.

Where n is set to 0 in Step ST500, the excitation voltage Tx0 is set at the H voltage. The excitation voltages Tx1, Tx2, and Tx3 are kept at the L voltage. This state is shown in p1-4 of FIG. 10.

From that time forward, Step ST503 is performed in such a manner that each excitation voltage is exclusively set at the H voltage in sequence. Of the excitation voltages of the excitation control circuit 203, the excitation voltage Tx1 alone is set at the H voltage (as shown in p2-4 of FIG. 10), and then, the excitation voltage Tx2 alone is set at the H voltage (as shown in p3-4 of FIG. 10). Subsequently, the excitation voltage Tx3 alone is set at the H voltage (as shown in p4-4 of FIG. 10).

Then, in Step ST504, an output of the integrator circuit is held. That is to say, the control signal tSh in the individual sample-and-hold circuit 205 is set at the H voltage after the output is stabilized. This state is shown in p1-5 of FIG. 10. Then, the individual sample-and-hold circuit 205 is switched to the hold state.

Then, in Step ST505, an A/D conversion is performed on the output of the integrator circuit. That is to say, an A/D conversion is performed at the timing at which the sampling signal tAdc in the individual A/D converter circuit 206 is set at the H voltage after the output of the integrator circuit is held. This state is shown in p1-6 of FIG. 10. The A/D-converted output is held until the next A/D conversion.

Then, in Step ST506, Steps ST501 to ST505 are repeated more than once for stable measurement. Averaging the measurement values obtained in Steps ST501 to ST505 improves the S/N ratio and stabilizes the operation accordingly.

Then, in Step ST507, n indicating the ordinal number of the individual X touch sensor is incremented by one.

Then, in Step ST508, it is determined whether n indicating the ordinal number of the individual X touch sensor is smaller than the total number of X touch sensors.

If n indicating the ordinal number of the individual X touch sensor is smaller than the total number of X touch sensor, that is, if "YES" in Step ST508 of FIG. 8, the operation returns to Step ST501. In Step ST503, the excitation voltage corresponding to the ordinal number is set at the H voltage.

Thus, Steps ST51 to ST505 are performed in such a manner that each of the excitation voltages Tx0, Tx1, Tx2, and Tx3 is exclusively set at the H voltage in sequence.

If n indicating the ordinal number of the individual X touch sensors is greater than or equal to the total number of X touch sensors, that is, if "NO" in Step ST508 of FIG. 8, the operation is ended.

The difference between FIG. 9 and FIG. 10 is as in the following. With reference to FIG. 9, in Step ST101, the excitation voltages Tx0, Tx1, Tx2, and Tx3 are fixed to the L voltage, and then in Step ST103, the potential of the internal GND 302 is excited by the control timing signal tStx. With reference to FIG. 10, in Step ST503, the potential of the internal GND 302 is not excited. Alternatively, in Step ST503, each of the excitation voltages Tx0, Tx1, Tx2, and Tx3 is exclusively excited in sequence.

For easy understanding of the description of FIG. 10, the capacitance of each of the X touch sensors has been measured once. Alternatively, each of p1 to p4 may be repeated more than once to average the measurement values for improved S/N ratio.

Effects of this preferred embodiment will now be described with reference to FIGS. 2 to 5.

With reference to FIGS. 2 and 3, the touch sensor panel 1 is touched by the pointer 7 such as a finger and is in contact with the high relative permittivity substance 703 such as water extending across the boundary between the protective sheet 106 lying right on the touch sensor 100 and the apparatus case 9.

The capacitance measured in the state in which the pointer 7 is coupled to the touch sensor 100 includes not only the coupling capacitance 701 between the pointer 7 such as a finger and the touch sensor 100 but also the coupling capacitance 705 between the high relative permittivity substance 703 and the frame 801 of the image display liquid crystal module 8 or the coupling capacitance 706 between the high relative permittivity substance 703 and the apparatus case 9.

Under the condition that the general GND connection, in which both the GND of the image display liquid crystal module 8 and the apparatus case 9 are connected to the ground point of the whole of the display, is established, the capacitance 707 measured via the pointer 7 and the capacitance 708 measured via the high relative permittivity substance 703 exceed the threshold value 709 for determining the presence or absence of a touch, as shown in FIG. 4. Thus, the measurement value obtained via the high relative permittivity substance 703 is erroneously detected as a touch of the pointer 7.

For the display according to this preferred embodiment equipped with a touch sensor panel, however, the internal GND 302 is excited in Step ST1 of FIG. 6, specifically, in Step ST103 of FIG. 7.

All points except for the ground point to which the pointer 7 is coupled are excited at the same potential accordingly. Thus, no potential difference arises between the touch sensor 100 and the frame 801 of the image display liquid crystal module 8 or between the touch sensor 100 and the apparatus case 9.

In the state in which the high relative permittivity substance 703 such as water extends across the boundary between the protective sheet 106 lying right on the touch sensor 100 and the apparatus case 9, the capacitance measured via the high relative permittivity substance 703 does not exceed the threshold value. As illustrated in FIG. 5, only the capacitance 707 measured via the pointer 7 exceeds the threshold value, and thus, no contact with the high relative permittivity substance 703 such as water is erroneously detected as a touch.

As mentioned above, the display according to this preferred embodiment equipped with a touch sensor panel can distinguish a touch of the pointer 7 from the contact with the high relative permittivity substance 703. The contact with the high relative permittivity substance 703 such as water is less likely to be detected in error as a touch.

Although the X-Y matrix touch sensor has been described above, a segment-type single-layer touch sensor may be applicable to the display according to this preferred embodiment equipped with a touch sensor panel.

With reference to FIG. 1, the signal isolation circuit 5 is located between the panel controller 2 and the host device 6. In a case where the host device for processing touch coordinates is at the same potential as the internal GND 302, the signal isolation circuit 5 is not necessary.

In this preferred embodiment, the control timing signal tStx is at the L voltage while the mutual capacitance is measured in Step ST5.

Step ST5 may be performed without deactivating the control timing signal tStx in such a manner that the frequency for measuring capacitance, or, 1/tStx being the inverse of the control timing signal tStx is set to a frequency at which the mutual capacitance measurement operation is subject to no interference. For example, the capacitance is measured at an odd harmonic, namely, the fundamental, the 3rd harmonic, or the 5th harmonic of the control timing signal tStx.

Second Preferred Embodiment

A display according to a second preferred embodiment will now be described. The constituent components similar to those described in the above preferred embodiment are denoted by the same reference signs, and description thereof will be omitted as appropriate.

Configuration of Display

Figure 11:
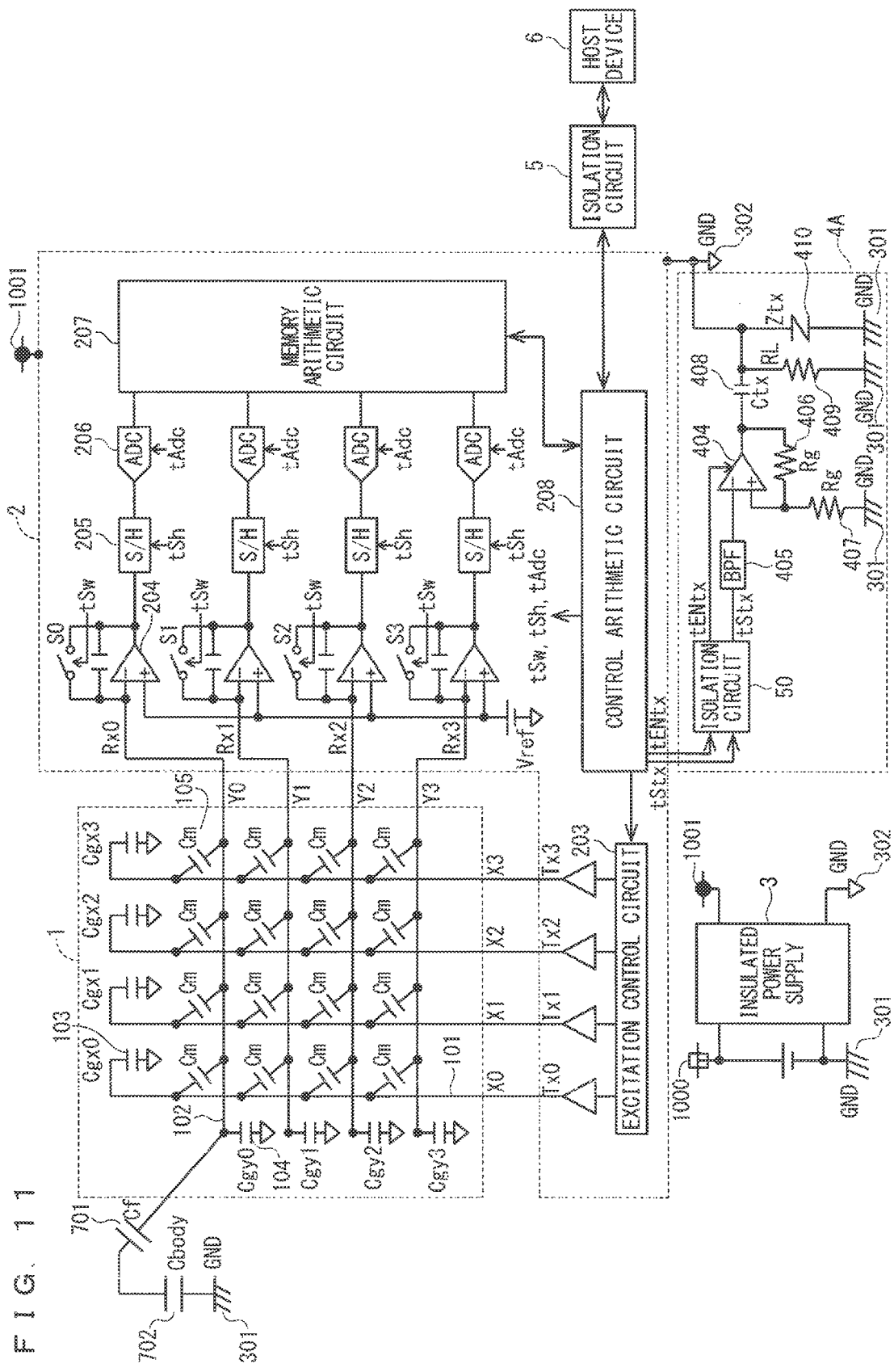
FIG. 11 schematically illustrates a configuration for providing a display according to another preferred embodiment equipped with a touch sensor panel.

FIG. 11 schematically illustrates a configuration for providing a display according to this preferred embodiment equipped with a touch sensor panel. FIG. 11 diagrammatically illustrates circuitry to be referred to in the following description and eliminates a typical component such as a bypass capacitor or a power supply protection circuit.

As illustrated in FIG. 11, the display equipped with a touch sensor panel includes the touch sensor panel 1, the panel controller 2, the insulated power supply circuit 3, a signal generation circuit 4A, the signal isolation circuit 5, and the host device 6.

The signal generation circuit 4A includes an operational amplifier 404 capable of exercising enable control and a band-pass filter 405. The signal generation circuit 4A is connected to the panel controller 2 through the signal isolation circuit 50.

In addition, the signal generation circuit 4A includes resistors 406 and 407, on which the gain of the operational amplifier 404 relies. The signal generation circuit 4A also includes a capacitor 408 that removes a direct-current component from the output of the operational amplifier 404, a resistor 409 for stabilizing the bias level, and a varistor 410.

The operational amplifier 404 is controlled according to a signal tENx input from the control arithmetic circuit 208 of the panel controller 2 through the signal isolation circuit 50.

The signal isolation circuit 50 receives an input of the control timing signal tStx from the panel controller 2. The band-pass filter 405 receives an input of the control timing signal tStx.

The band-pass filter 405 permits only fundamental frequency components of the control timing signal tStx to pass therethrough. The output through the band-pass filter 405 is input to a noninverting input terminal of the operational amplifier 404.

The signal generation circuit 4A having the above-mentioned configuration generates a sinusoidal signal of a frequency tStx. The sinusoidal signal of the frequency tStx is used to excite the internal GND 302.

Although not shown in the drawings, the signal generation circuit 4A is powered through the external power supply 1000 by itself or the external power supply 1000 in conjunction with a booster circuit or the like.

The capacitor 408 and the resistor 409 are additionally included, when necessitated, with consideration given to the dynamic range of the circuitry in the power supply voltage configuration.

Operation of Display

Figure 12:
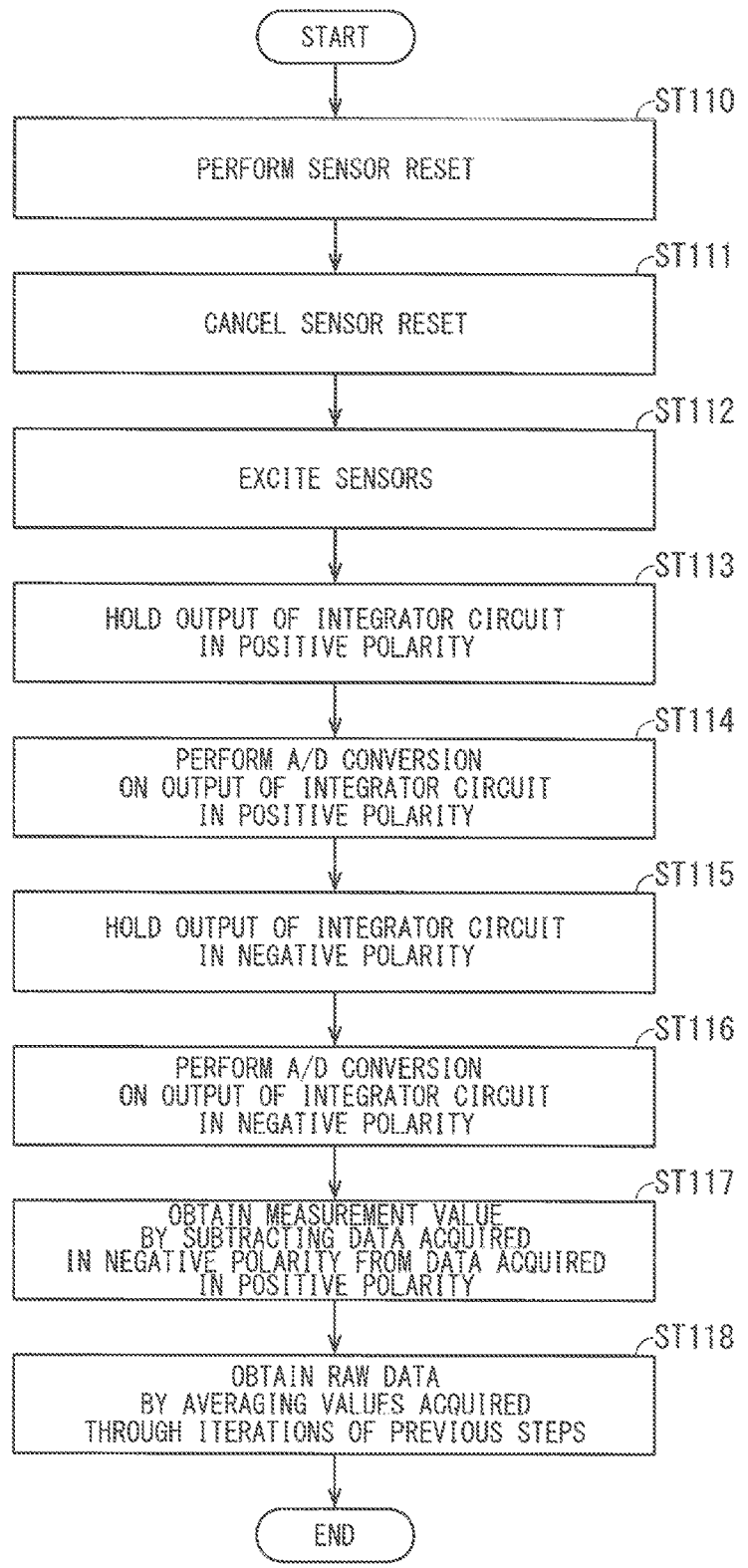
FIG. 12 is a flowchart illustrating an operation performed by the display according to another preferred embodiment equipped with a touch sensor panel.

With reference to FIG. 12, the following will describe an operation performed by the display according to this preferred embodiment equipped with a touch sensor panel.

FIG. 12 is a flowchart illustrating an operation performed by the display according to this preferred embodiment equipped with a touch sensor panel.

Figure 13:
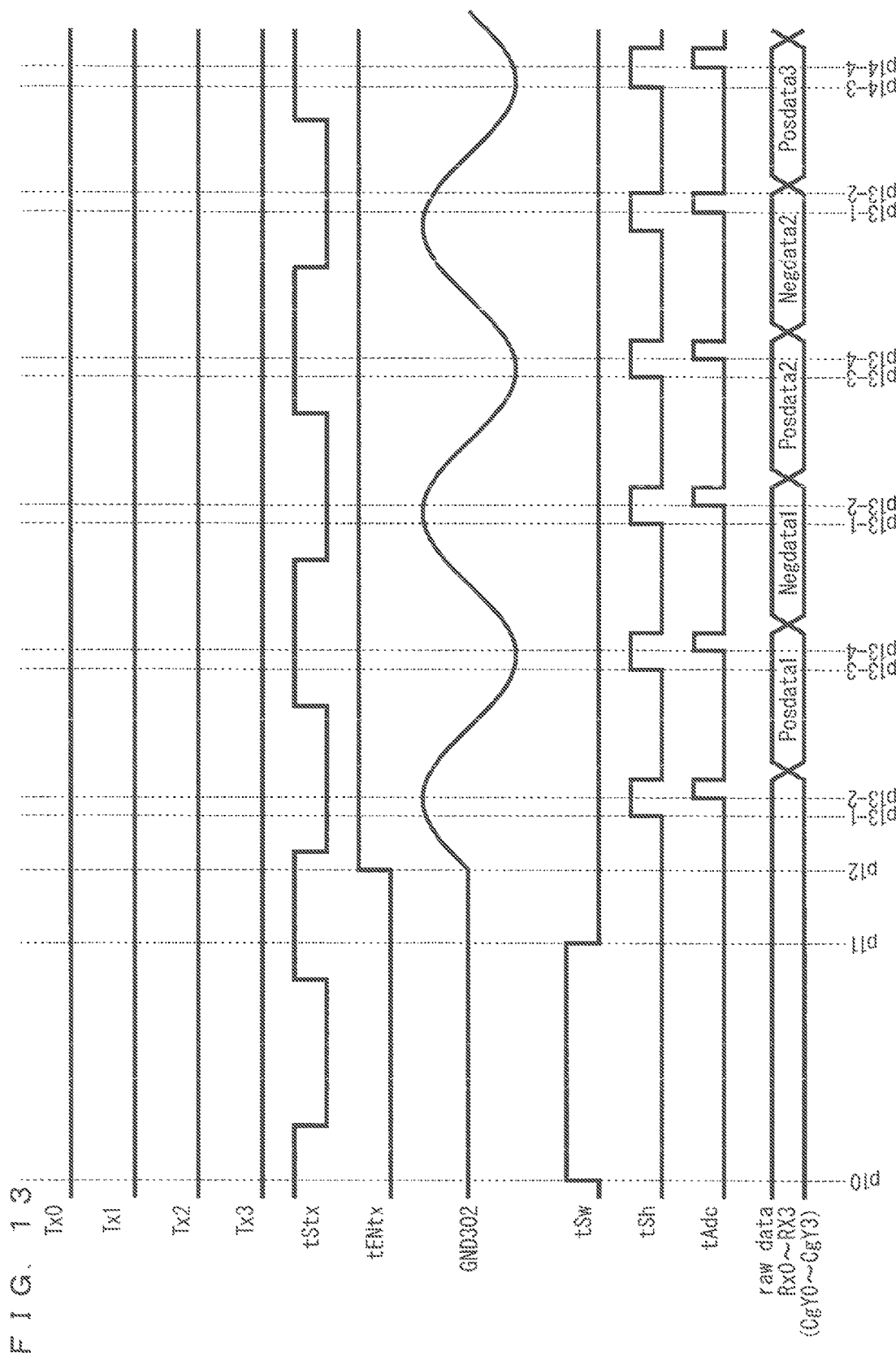
FIG. 13 is a timing chart corresponding to the flowchart of FIG. 12.

FIG. 12 is a flowchart illustrating, in detail, the operation in Step ST1 of FIG. 6. FIG. 13 is a timing chart corresponding to the flowchart of FIG. 12.

Step ST1 of FIG. 6 will now be described with reference to the flowchart of FIG. 12 and the timing chart of FIG. 13.

Each cycle of the capacitance measurement operation is divided into steps of performing a sensor reset (Step ST110), cancelling the sensor reset (Step ST111), exciting the sensors with the use of to a sinusoidal signal (Step ST112), holding an output of the integrator circuit during the interval that the sinusoidal signal is positive (Step ST113) and the interval that the sinusoidal signal is negative (Step ST115), and performing an A/D conversion on the output, which has been maintained consistent in response to a hold signal, of the integrator circuit in the positive polarity (Step ST114) and in the negative polarity (Step ST116).

Firstly, in Step ST110, a sensor reset is performed. That is to say, the excitation voltages Tx0, Tx1, Tx2, and Tx3 of the excitation control circuit 203 are fixed to the L voltage. The L voltage is denoted by VoL.

The operational amplifier 404 is reset. At this time, the signal tENx is at the L voltage, and an output enable switch of the operational amplifier 404 is off.

The integrator amplifiers 204 are reset. At this time, the control signal tSw in the individual integrator amplifier 204 is at the H voltage. This state is shown in p10 of FIG. 13. The switches S0, S1, S2, and S3 of the respective integrator amplifiers 204 are all turned on.

Then, in Step ST111, the sensor reset is canceled. That is to say, the reset performed on the integrator amplifiers 204 is canceled. At this time, the control signal tSw in the individual integrator amplifier 204 is at the L voltage, and the switches S0, S1, S2, and S3 of the respective integrator amplifiers 204 are all turned off. This state is shown in p11 of FIG. 13.

In Step ST112, the sensors are excited. The control timing signal tStx is toggled all the time. Then, a signal tENtx is turned on, or, set at the H voltage, and thus the potential of the internal GND 302 is excited by the sinusoidal signal with reference to the external GND 301. This state is shown in p12 of FIG. 13. The potential of the internal GND 302 is then excited with the use of the external power supply 1000 with reference to the external GND 301.

Then, in Step ST113, the output of the integrator circuit in the positive polarity is held. That is to say, the control signal tSh in the individual sample-and-hold circuit 205 is set at the H voltage as the polarity of the sinusoidal signal reverses after the output is stabilized. This state is shown in p13-1 of FIG. 13. Then, the individual sample-and-hold circuit 205 is switched to the hold state.

Then, in Step ST114, an A/D conversion is performed on the output of the integrator circuit in the positive polarity. That is to say, an A/D conversion is performed at the timing at which the sampling signal tAdc in the individual A/D converter circuit 206 is set at the H voltage after the output of the integrator circuit is held. This state is shown in p13-2 of FIG. 13. The A/D-converted output is held until the next A/D conversion.

Then, in Step ST115, an output of the integrator circuit in the negative polarity is held. That is to say, the control signal tSh in the individual sample-and-hold circuit 205 is set at the H voltage as the polarity of the sinusoidal signal reverses after the output is stabilized. This state is shown in p13-3 of FIG. 13. Then, the individual sample-and-hold circuit 205 is switched to the hold state.

Then, in Step ST116, an A/D conversion is performed on the output of the integrator circuit in the negative polarity. That is to say, an A/D conversion is performed at the timing at which the sampling signal tAdc in the individual A/D converter circuit 206 is set at the H voltage after the output of the integrator circuit is held. This state is shown in p13-4 of FIG. 13. The A/D-converted output is held until the next A/D conversion.

Then, in Step ST117, a measurement value is obtained by subtracting the data acquired in the negative polarity from the data acquired in the positive polarity.

The raw data is obtained by averaging values acquired through iterations of Steps ST112 to ST117. This operation corresponds to Step ST118 of FIG. 12.

With reference to FIG. 11, there are time delays, such as phase lags, associated with the sinusoidal wave produced by the signal generation circuit 4A being an analog circuit. The signal tStx has a continuous waveform such that the voltage can be sampled and held at the peak times of the sinusoidal wave in the positive and negative polarities, irrespective of phase lags. The control arithmetic circuit 208 adjusts the timing of output.

As mentioned above, the display according to this preferred embodiment equipped with a touch sensor panel uses a sinusoidal signal for exciting the potential of the internal GND 302.

The energy of the sinusoidal wave with very little distortion is based solely on the fundamental component and contains no harmonic component. Thus, the touch sensor panel 1 is less likely to cause electromagnetic interference (EMI) which affects other devices.

The configuration described in this preferred embodiment can minimize the chances that the touch sensor panel will erroneously detect the contact with water or the like as a touch, as in the first preferred embodiment.

A display equipped with a touch sensor panel having the configuration described in this preferred embodiment is less likely to cause electromagnetic interference (EMI) which affects other devices.

Third Preferred Embodiment

A display according to a third preferred embodiment will now be described. The constituent components similar to those described in the above preferred embodiments are denoted by the same reference signs, and description thereof will be omitted as appropriate.

Configuration of Display

Figure 14:
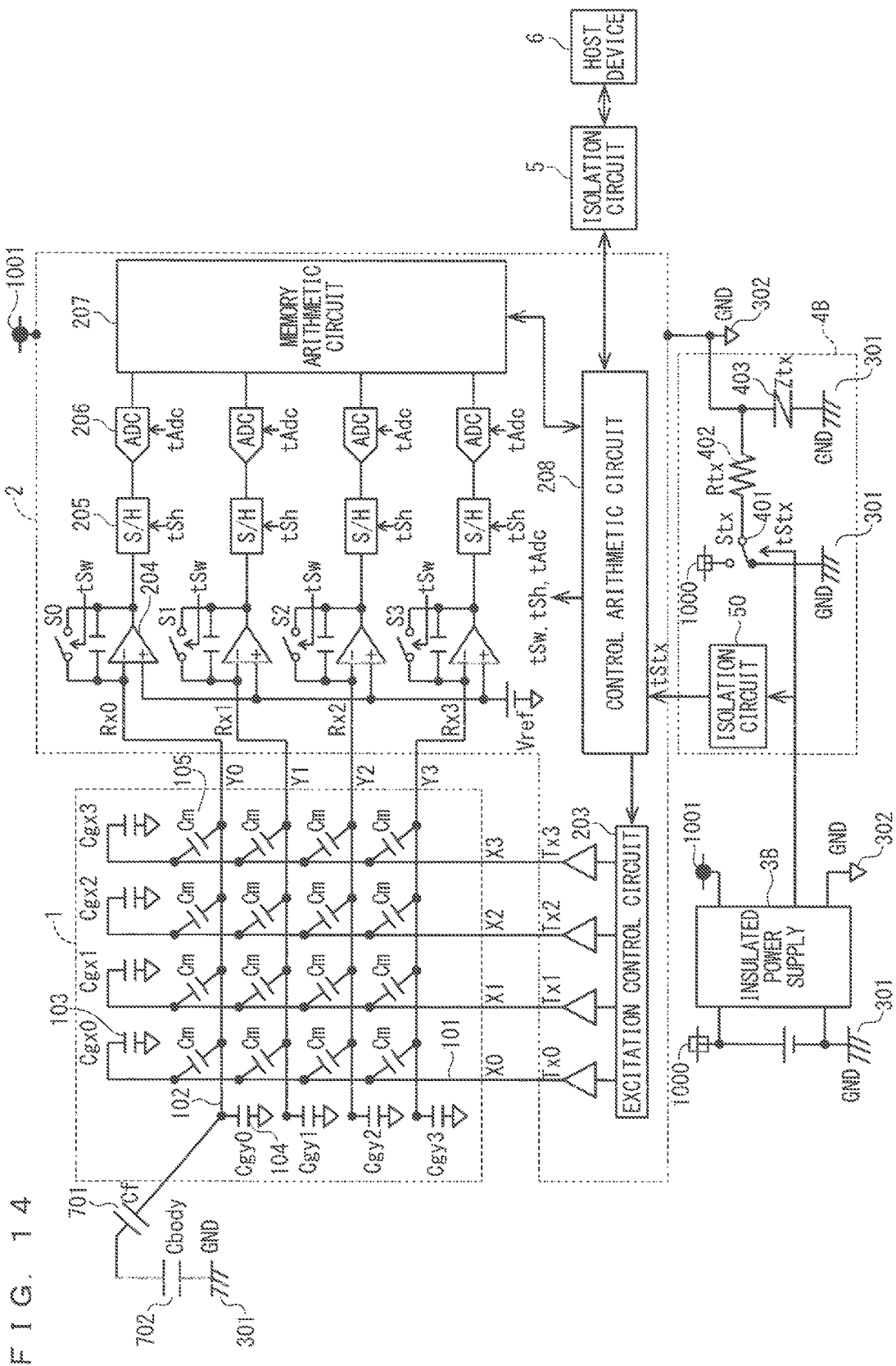
FIG. 14 schematically illustrates a configuration for providing the display according to still another preferred embodiment equipped with a touch sensor panel.

FIG. 14 schematically illustrates a configuration for providing a display according to this preferred embodiment equipped with a touch sensor panel. FIG. 14 diagrammatically illustrates circuitry to be referred to in the following description and eliminates a typical component such as a bypass capacitor or a power supply protection circuit.

As illustrated in FIG. 14, the display equipped with a touch sensor panel includes the touch sensor panel 1, the panel controller 2, an insulated power supply circuit 3B, a signal generation circuit 4B, the signal isolation circuit 5, and the host device 6.

The insulated power supply circuit 3B is connected to the external power supply 1000 and the external GND 301. The insulated power supply circuit 3B generates the internal power supply 1001 of the panel controller 2 and the internal GND 302 of the panel controller 2 based on the external power supply 1000 and the external GND 301.

The signal generation circuit 4B is a circuit that generates an AC signal with reference to the external power supply 1000 and the external GND 301 being the ground point. The signal generation circuit 4B includes the signal isolation circuit 50 and the switch 401. The signal generation circuit 4 is connected to the panel controller 2 through the signal isolation circuit 50.

The insulated power supply circuit 3B generates the control timing signal tStx for controlling the switch 401. The insulated power supply circuit 3B outputs the control timing signal tStx to the signal isolation circuit 50 and the switch 401.

The signal isolation circuit 50 outputs the control timing signal tStx to the control arithmetic circuit 208. The control arithmetic circuit 208 can accordingly generate, for example, the control signal tSw for the individual integrator amplifier 204, the control signal tSh for the individual sample-and-hold circuit 205, and the sampling signal tAdc for the individual A/D converter circuit 206, in synchronization with the control timing signal tStx.

The insulated power supply circuit 3B generally includes a clock for generating an output power supply. The clock usually operates at a frequency of 100 kHz or thereabouts, at which capacitance is to be measured.

The insulated power supply circuit 3B is preferably configured to minimize noise in the internal GND 302 being the secondary GND. In this preferred embodiment, however, the insulated power supply circuit 3B is synchronized with the clock while generating power supply. With the internal GND 302 being high in noise, the insulated power supply circuit 3B can still stabilize the operation associated with the excitation of the internal GND 302.

Effects of Above-Mentioned Preferred Embodiments

Effects of the above-mentioned preferred embodiments will now be described. The effects which will be described below are based on the configuration specifically described in the preferred embodiments above. This configuration may be replaced with another specific configuration described herein, as long as the same effects can be produced.

The configuration concerned may be replaced with more than one preferred embodiments. That is to say, the same effects can be produced by varying combinations of configurations described in the preferred embodiments.

According to the preferred embodiments above, the display includes the touch sensor panel 1, the panel controller 2, the case that accommodates the display, and the signal generation circuit 4. The apparatus case 9 is the equivalent of the above-mentioned case that accommodates the display. The touch sensor panel 1 includes the touch sensor 100. The panel controller 2 measures the capacitance of the touch sensor 100. The apparatus case 9 is a case that accommodates the display including at least the touch sensor panel 1 and the panel controller 2. The apparatus case 9 is electrically connected to the ground of the panel controller 2. The signal generation circuit 4 can apply an AC signal to the ground of the panel controller 2. When the signal generation circuit 4 applies the AC signal to the ground of the panel controller 2, the panel controller 2 measures the capacitance of the touch sensor 100.

This configuration can minimize the chances that the contact with the high relative permittivity substance 703 such as water extending across the boundary between the touch sensor panel 1 and the surrounding area will be erroneously detected as a touch. Specifically, the apparatus case 9 is electrically connected to the ground of the panel controller 2, so that an AC signal is applied to the capacitance between the touch sensor 100 and the pointer 7, with no potential difference arising between the touch sensor 100 and the apparatus case 9. When the touch sensor panel 1 comes into contact with the high relative permittivity substance 703 extending across the boundary between the touch sensor panel 1 and the surrounding area, the measured coupling capacitance 706 between the apparatus case 9 and the high relative permittivity substance 703 does not exceed the threshold value. The contact with the high relative permittivity substance 703 extending across the boundary between the touch sensor panel 1 and the surrounding area is less likely to be detected in error as a touch. In addition, the position of a touch of the pointer 7 can be accurately determined in the area that is not in contact with the high relative permittivity substance 703.

The other configurations mentioned herein may be eliminated as appropriate. That is to say, the effects above can be produced solely by the configurations specified above.

Alternatively, the same effects can be produced by adding at least one of the other configurations mentioned herein, that is, by adding any configuration that has been mentioned herein but has not been specified above.

In one of the above-mentioned preferred embodiment, the signal generation circuit 4 can apply a rectangular wave signal, which is an AD signal, to the ground of the panel controller 2. In this configuration, the rectangular wave signal can be also applied to the apparatus case 9 electrically connected to the ground of the panel controller 2. The capacitance of the touch sensor 100 is measured in this state, and thus, the position of a touch of the pointer 7 can be accurately determined even if the touch sensor panel 1 is in contact with the high relative permittivity substance 703 such as water extending across the boundary between the touch sensor panel 1 and the surrounding area.

In one of the above-mentioned preferred embodiment, the signal generation circuit 4A can apply a sinusoidal signal to the ground of the panel controller 2. In this configuration, the sinusoidal signal can be also applied to the apparatus case 9 electrically connected to the ground of the panel controller 2. The capacitance of the touch sensor 100 is measured in this state, and thus, the position of a touch of the pointer 7 can be accurately determined even if the touch sensor panel 1 is in contact with the high relative permittivity substance 703 such as water extending across the boundary between the touch sensor panel 1 and the surrounding area.

In one of the above-mentioned preferred embodiments, the signal generation circuit applies an AC signal to the ground of the panel controller 2 according to the sampling timing tAdc, which is a control signal for controlling the individual A/D converter circuit 206 of the panel controller 2. In this configuration, the measurement of the capacitance of the touch sensor 100 can be synchronized with the application of an AC signal to the ground of the panel controller 2.

In one of the above-mentioned preferred embodiments, the display includes a liquid crystal module. The image display liquid crystal module 8 is the equivalent of the liquid crystal module. The image display liquid crystal module 8 is disposed so as to overlap the touch sensor panel 1 in a plan view. The ground of the image display liquid crystal module 8 is electrically connected to the ground of the panel controller 2. In this configuration in which the ground of the panel controller 2 is electrically connected to the ground of the image display liquid crystal module 8, there is no potential difference between the panel controller 2 and the image display liquid crystal module 8. Thus, the measured coupling capacitance 706 between the image display liquid crystal module 8 and the high relative permittivity substance 703 does not exceed the threshold value. This configuration can minimize the chances that the contact with the high relative permittivity substance 703 such as water extending across the boundary between the touch sensor panel 1 and the surrounding area will be erroneously detected as a touch. The position of a touch of the pointer 7 can be accurately determined accordingly.

In one of the above-mentioned preferred embodiments, the display includes the signal isolation circuit 5 and the host device 6. The signal isolation circuit 5 is electrically connected to the panel controller 2. The host device 6 is electrically connected to the signal isolation circuit 5. In this configuration, the panel controller 2 and the host device 6 are connected to the respective grounds, instead of being electrically connected to each other.

Modifications of Above-Mentioned Preferred Embodiments

The materials, ingredients, dimensions, shapes, relative positional relations, and implementation conditions, which may have been mentioned in the preferred embodiments, are in all aspects illustrative and not restrictive.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Any constituent component in the singular in the preferred embodiments may be replaced by the plural, as long as no contradiction arises.

Each constituent component mentioned in the preferred embodiments is a conceptual unit. According to the technique disclosed herein, each constituent component may be composed of a plurality of structures or may be part of one structure, or a plurality of constituent components may be included in one structure.

Each constituent component mentioned in the preferred embodiments may have a different structure or shape, as long as it can perform the same function.

The description given herein may be referenced for any purpose related to this technique and should not be construed as being prior art.

Unless otherwise noted, material names mentioned in the preferred embodiments may also refer to the materials containing additives such as alloys, as long as no contradiction arises.

What is claimed is:

1. A display comprising:
   a touch sensor panel including a touch sensor;
   a panel controller that measures a capacitance of said touch sensor;
   a case that accommodates said display, in which at least said touch sensor panel and said panel controller are disposed; and
   a signal generation circuit capable of applying an AC signal to a ground of said panel controller, wherein
   said case is electrically connected to the ground of said panel controller, and
   when said signal generation circuit applies the AC signal to the ground, said panel controller measures the capacitance of said touch sensor.

2. The display according to claim 1, wherein
   said signal generation circuit is capable of applying a rectangular wave signal.

3. The display according to claim 1, wherein
   said signal generation circuit is capable of applying a sinusoidal signal.

4. The display according to claim 1, wherein
   said signal generation circuit applies the AC signal to the ground of said panel controller according to a control signal for controlling an analog-to-digital (A/D) converter circuit of said panel controller.

5. The display according to claim 1, further comprising:
   a liquid crystal module disposed so as to overlap said touch sensor panel in a plan view, wherein
   the ground of said panel controller is electrically connected with a ground of said liquid crystal module.

6. The display according to claim 1, further comprising:
   a signal isolation circuit electrically connected to said panel controller; and
   a host device electrically connected to said signal isolation circuit.

7. The display according to claim 1, wherein
   said panel controller is connected to the ground generated by a power supply circuit that supplies power to said panel controller.

8. The display according to claim 1, wherein
   said signal generation circuit is capable of receiving a control timing signal from said panel controller and applying the AC signal to the ground of said panel controller.

9. The display according to claim 8, wherein
   said signal generation circuit applies the AC signal to the ground of said panel controller according to the control timing signal from said panel controller, the control timing signal being for controlling an analog-to-digital (A/D) converter circuit of said panel controller.

* * * * *